(12) United States Patent
Kanii et al.

(10) Patent No.: US 11,288,723 B2
(45) Date of Patent: Mar. 29, 2022

(54) INFORMATION PROCESSING DEVICE AND INFORMATION PROCESSING METHOD

(71) Applicant: SONY CORPORATION, Tokyo (JP)

(72) Inventors: Yui Kanii, Tokyo (JP); Kazuma Yoshii, Tokyo (JP); Naoko Ishiduka, Kanagawa (JP); Fumiko Shiga, Tokyo (JP); Yue Ouyang, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/777,878

(22) PCT Filed: Sep. 2, 2016

(86) PCT No.: PCT/JP2016/075823
§ 371 (c)(1),
(2) Date: May 21, 2018

(87) PCT Pub. No.: WO2017/098760
PCT Pub. Date: Jun. 15, 2017

(65) Prior Publication Data
US 2018/0374136 A1      Dec. 27, 2018

(30) Foreign Application Priority Data

Dec. 8, 2015    (JP) .............................. JP2015-239081

(51) Int. Cl.
*G06Q 30/06* (2012.01)
*G06F 16/00* (2019.01)
*G06F 16/907* (2019.01)

(52) U.S. Cl.
CPC ......... *G06Q 30/0621* (2013.01); *G06F 16/00* (2019.01); *G06F 16/907* (2019.01); *G06Q 30/0643* (2013.01)

(58) Field of Classification Search
CPC ............ G06Q 30/0621; G06Q 30/0643; G06F 16/907; G06F 16/00
(Continued)

(56) References Cited

U.S. PATENT DOCUMENTS 9,183,510 B1    11/2015   Walti et al.
9,454,780 B2 *   9/2016   Paul ..................... G06Q 10/101
(Continued)

FOREIGN PATENT DOCUMENTS

BR    PI0904359 A2      2/2011
CA       2689757 A1 *   1/2009
(Continued)

OTHER PUBLICATIONS

Esheiba, Laila, et al, Recommendation Framework for on-Demand Smart Product Customization, 2017, Faculty of Computers and Information, Cairo University, Cairo, Egypt (Year: 2017).*

(Continued)

*Primary Examiner* — Matthew E Zimmerman
*Assistant Examiner* — Thomas Joseph Sullivan
(74) *Attorney, Agent, or Firm* — Chip Law Group (57) ABSTRACT

There is provided an information processing device including an extraction unit configured to extract a parameter for generating an article design on a basis of content selected by a user and related information related to the content, a generation unit configured to generate a design of a designated article by using the parameter, and a presentation control unit configured to perform control to present the generated design to the user.

15 Claims, 6 Drawing Sheets

(58) Field of Classification Search
USPC .................................................. 705/26, 26.5
See application file for complete search history.

(56) References Cited

U.S. PATENT DOCUMENTS

| | | | |
|---|---|---|---|
| 2004/0148572 A1* | 7/2004 | Nakanishi | G06F 16/9577 715/253 |
| 2009/0319076 A1 | 12/2009 | Fernandez | |
| 2010/0121875 A1 | 5/2010 | Sakai | |
| 2011/0088064 A1* | 4/2011 | Xiong | H04N 21/2668 725/51 |
| 2013/0142423 A1 | 6/2013 | Zhnag et al. | |
| 2013/0173413 A1* | 7/2013 | Page | G06F 3/011 705/26.5 |
| 2014/0108148 A1 | 4/2014 | Paul et al. | |
| 2014/0182170 A1* | 7/2014 | Wawrousek | A43B 13/223 36/103 |
| 2014/0365336 A1* | 12/2014 | Hurewitz | G06Q 30/0625 705/26.62 |
| 2015/0088921 A1* | 3/2015 | Somaiya | G06F 16/951 707/767 |
| 2015/0154678 A1* | 6/2015 | Fonte | G16B 5/00 705/26.5 |
| 2015/0186154 A1* | 7/2015 | Brown | G06Q 10/10 715/706 |
| 2015/0277155 A1* | 10/2015 | Raviv | G02C 13/005 351/178 |
| 2016/0086206 A1* | 3/2016 | Churchill | H04L 67/22 705/7.32 |
| 2017/0352091 A1* | 12/2017 | Chen | G06F 3/0482 |
| 2018/0374136 A1 | 12/2018 | Kanii et al. | |

FOREIGN PATENT DOCUMENTS

| | | |
|---|---|---|
| CN | 101742170 A | 6/2010 |
| CN | 102473267 A | 5/2012 |
| CN | 104394729 A | 3/2015 |
| EP | 2184693 A1 | 5/2010 |
| JP | 2001-216528 A | 8/2001 |
| JP | 2002-189844 A | 7/2002 |
| JP | 2003-055826 A | 2/2003 |
| JP | 2007-280351 A | 10/2007 |
| JP | 2010-066366 A | 3/2010 |
| JP | 2010-113593 A | 5/2010 |
| JP | 2010-134790 A | 6/2010 |
| JP | 2011-228918 A | 11/2011 |
| KR | 20080002187 A * | 1/2008 |
| RU | 2009140826 A | 5/2011 |
| WO | 2007/043679 A1 | 4/2007 |

OTHER PUBLICATIONS

Gong, Wei, et al, Aesthetics, Personalization and Recommendation: A survey on Deep Learning in Fashion, 2020, J. ACM, vol. 00, No. 0, Article 111. (Year: 2020).*

Dahunsi, Bolanle, An Ontology-based Knowledgebase for User Profile and Garment Features in Apparel Recommender Systems, RecSys '21, Sep. 27-Oct. 1, 2021 (Year: 2021).*

Chakraborty, Samit, et al, Fashion Recommendation Systems, Models and Methods: A Review, 2021, informatics (Year: 2011).*

Sakazaki, et al., "A New Clothes Image Retrieval System Based on the Customers Preference", The Institute of Electronics Information and Communication Engineers, IEICE Technical Report OIS2006-64 (Jan. 2007), 08 pages.

Sakazaki, et al., "A New Clothes Image Retrieval System based on the Customers Preference", The Institute of Electronics, Information and Communication Engineers, IEICE Technical Report, OIS2006-64 (Jan. 2007), vol. 106, No. 464, Dec. 2007, 08 pages.

Ohtake, et al., "Apparel Products Image Retrieval System using Kansei Information Modeling of Subjective Similarity by using Image Feature", The Institute of Image Information and Television Engineers, ITE Technical Report vol. 25, No. 64, Oct. 2001, pp. 41-46.

International Search Report and Written Opinion of PCT Application No. PCT/JP2016/075823, dated Oct. 25, 2016, 09 pages.

Sakazaki, et al., "A New Clothes Image Retrieval System based on the Customers Preference", Institute of Electronics, Information and Communication Engineers, Technical Report, vol. 106, No. 464, Jan. 2007, pp. 7-12.

Ohtake, et al., "Apparel Products Image Retrieval System using Kansei Information", ITE Technical Report, vol. 25, No. 64, Oct. 2001, pp. 41-46.

Office Action for JP Patent Application No. 2017-554938, dated Oct. 27, 2020, 04 pages of Office Action and 04 pages of English Translation.

Office Action for CN Patent Application No. 201680070215.8, dated Jul. 29, 2021, 17 pages of Office Action and 25 pages of English Translation.

Zhaoling Ding, "Winning at the Terminal:81 Lectures on Fine Management of Clothing Stores", Enterprise Management Publishing House, May 31, 2014, 20 Pages.

Office Action for CN Patent Application No. 201680070215.8, dated Dec. 14, 2021, 26 pages of English translation and 16 pages of Office Action.

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2016/075823 filed on Sep. 2, 2016, which claims priority benefit of Japanese Patent Application No. JP 2015-239081 filed in the Japan Patent Office on Dec. 8, 2015. Each of the above-referenced applications is hereby incorporated herein by reference in its entirety.

TECHNICAL FIELD

The present disclosure relates to an information processing device, an information processing method, and a program.

BACKGROUND ART

In recent years, communication technology has developed, so that information exchange between an individual and a company and between individuals has been performed actively. Normally, products sold for general consumers are products commercialized by the company side unilaterally drawing up designs; recently, however, in order to reflect consumers' preferences, systems have been proposed that carry out production on order according to a design created by a user himself/herself or a combination of parts selected from some prepared parts by the user himself/herself, via the Internet etc. (Patent Literatures 1 and 2 below).

CITATION LIST

Patent Literature

Patent Literature 1: JP 2002-189844A
Patent Literature 2: JP 2007-280351A
Patent Literature 3: JP 2010-66366A
Patent Literature 4: JP 2011-228918A
Patent Literature 5: JP 2010-134790A

DISCLOSURE OF INVENTION

Technical Problem

However, the user himself/herself creating a design or customization by combining parts makes it possible to reflect one's own preference, but has the following problems: it takes time to decide a design and select and purchase materials, and some users want to express one's own originality but cannot create a design as imagined.

In regard to recommendation in accordance with the user's preference, Patent Literature 3, for example, describes a technology of evaluating similarity between musical piece assemblies, between a musical piece and a musical piece assembly, etc. and recommending a set of musical pieces or a musical piece corresponding to the user's preference. In addition, Patent Literature 4 describes a technology of appropriately detecting a specific scene, on the basis of similarity degree information between a composition of an image and a composition of the specific scene based on image data separated from a moving image, and similarity degree information between audio data separated from the moving image and audio data of the specific scene, and presenting playback of the specific scene to the user. In addition, Patent Literature 5 describes a technology of using waveform data of a musical piece as an input and controlling motion of CG video, thereby visualizing music. However, none of them refer to recommendation of product designs etc.

Hence, the present disclosure proposes an information processing device, an information processing method, and a program capable of generating an article design on the basis of content selected by a user, and reducing burdens on the user.

Solution to Problem

According to the present disclosure, there is provided an information processing device including: an extraction unit configured to extract a parameter for generating an article design on a basis of content selected by a user and related information related to the content; a generation unit configured to generate a design of a designated article by using the parameter; and a presentation control unit configured to perform control to present the generated design to the user.

According to the present disclosure, there is provided an information processing method including, by a processor: extracting a parameter for generating an article design on a basis of content selected by a user and related information related to the content; generating a design of a designated article by using the parameter; and performing control to present the generated design to the user.

According to the present disclosure, there is provided a program causing a computer to function as: an extraction unit configured to extract a parameter for generating an article design on a basis of content selected by a user and related information related to the content; a generation unit configured to generate a design of a designated article by using the parameter; and a presentation control unit configured to perform control to present the generated design to the user.

Advantageous Effects of Invention

As described above, according to the present disclosure, an article design can be generated on the basis of content selected by a user, and burdens on the user can be reduced.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Description will be given in the following order.
1. Overview of information processing system according to embodiment of the present disclosure
2. Configuration
2-1. Overall configuration
2-2. Configuration of user terminal
2-3. Configuration of server
3. Operation processing
3-1. Design presentation processing
3-2. Design generation processing
4. Display example
5. Conclusion

1. OVERVIEW OF INFORMATION PROCESSING SYSTEM ACCORDING TO EMBODIMENT OF THE PRESENT DISCLOSURE

In an information processing system according to an embodiment of the present disclosure, an article design imagined by a user is generated on the basis of content selected by the user, which can reduce burdens on the user. First, an overview of the information processing system according to the present embodiment is described with reference to FIG. 1. Note that the present embodiment describes the case of designing fashion (including clothing, shoes, bags, and ornaments) as an example of an article design, but examples also include tableware such as cups, electronic devices, and toys.

Figure 1:
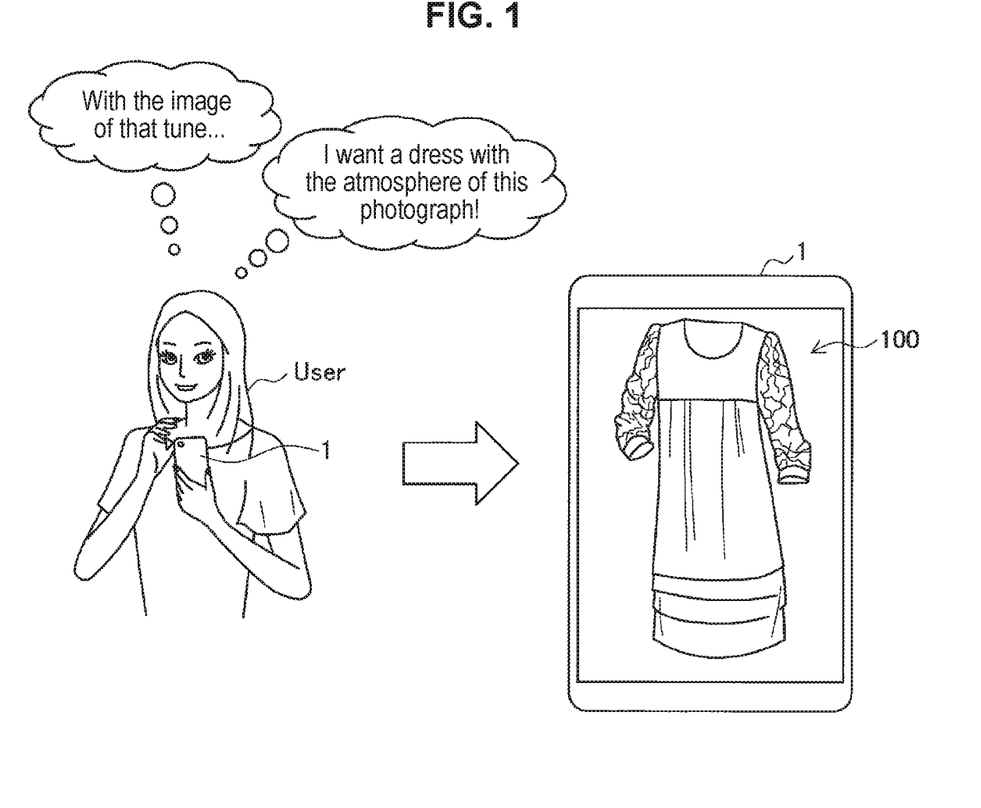
FIG. 1 is a diagram for describing an overview of an information processing system according to an embodiment of the present disclosure.

FIG. 1 is a diagram for describing an overview of the information processing system according to an embodiment of the present disclosure. First, as illustrated on the left side of FIG. 1, the user posts a material such as musical piece information, a captured image, or a keyword (text data) from a user terminal 1 such as a smartphone, and designates a fashion category (tops, jackets/outerwear, dresses, etc.). Specifically, the user uploads, for example, a favorite musical piece, illustration image, taken image (e.g., an image taken of an animal, scenery, a pattern, an illustration, etc.), or the like to a server 2 (see FIG. 2). In addition, examples of a keyword include "summer music festival", "Halloween", "vintage", and the like. Then, the server 2 generates a fashion design imaged from the posted material, and causes a generated design image 100 to be presented to the user from the user terminal 1 as illustrated on the right side of FIG. 1.

In this manner, only by posting materials such as favorite images and music, the user can enjoy a product preview of a design imaged from these materials, without performing complicated manipulations, such as taking time to generate a fashion design and assembling items selected from a large number of fashion items. In addition, it is possible to invoke buying intention by enabling the user to easily post a material and see a product preview in spare time such as a recess at school, a break at work, between household chores, or train waiting time. Moreover, content selection of great originality by the user can lead to unexpected discovery of a fashion that matches preference. In addition, discovery of a fashion of great originality can be expected to influence introduction of new fashion trends.

The overview of the information processing system according to the present embodiment has been described. Now, a configuration and operation processing of the information processing system according to the present embodiment will be specifically described.

2. CONFIGURATION

<2-1. Overall Configuration>

Figure 2:
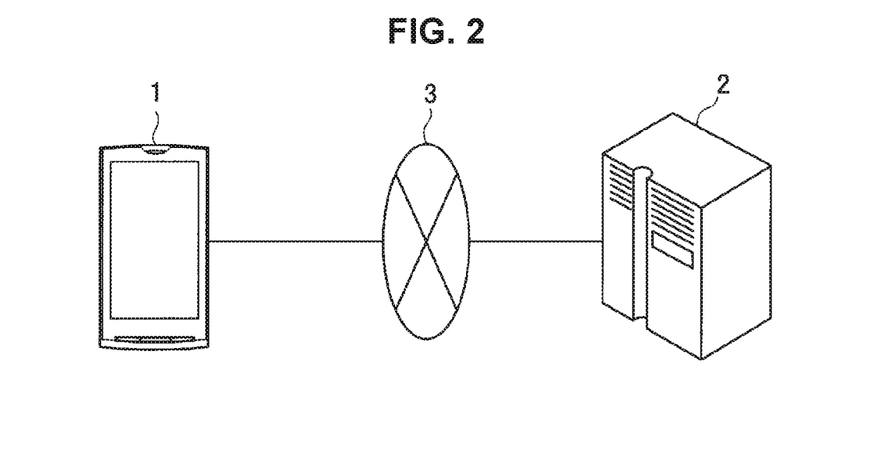
FIG. 2 is a diagram for describing an overall configuration of the information processing system according to the present embodiment.

FIG. 2 is a diagram for describing an overall configuration of the information processing system according to the present embodiment. As illustrated in FIG. 2, the information processing system according to the present embodiment includes the user terminal 1 and the server 2. The user terminal 1 and the server 2 are connected to each other via a network 3, for example, to be able to transmit and receive data.

The user terminal 1 is not limited to a smartphone as illustrated, and may be, for example, a mobile terminal such as a cell phone terminal or a tablet terminal, or a wearable terminal such as a smartwatch or smart eyeglasses.

The server 2 receives content to serve as a material of a fashion design, such as an image or a musical piece, from the user terminal 1 via the network 3, generates a design of a designated fashion category on the basis of the content, and sends back an image showing the generated design to the user terminal 1.

Specific configurations of the user terminal 1 and the server 2 are described in order below.

<2-2. Configuration of User Terminal>

Figure 3:
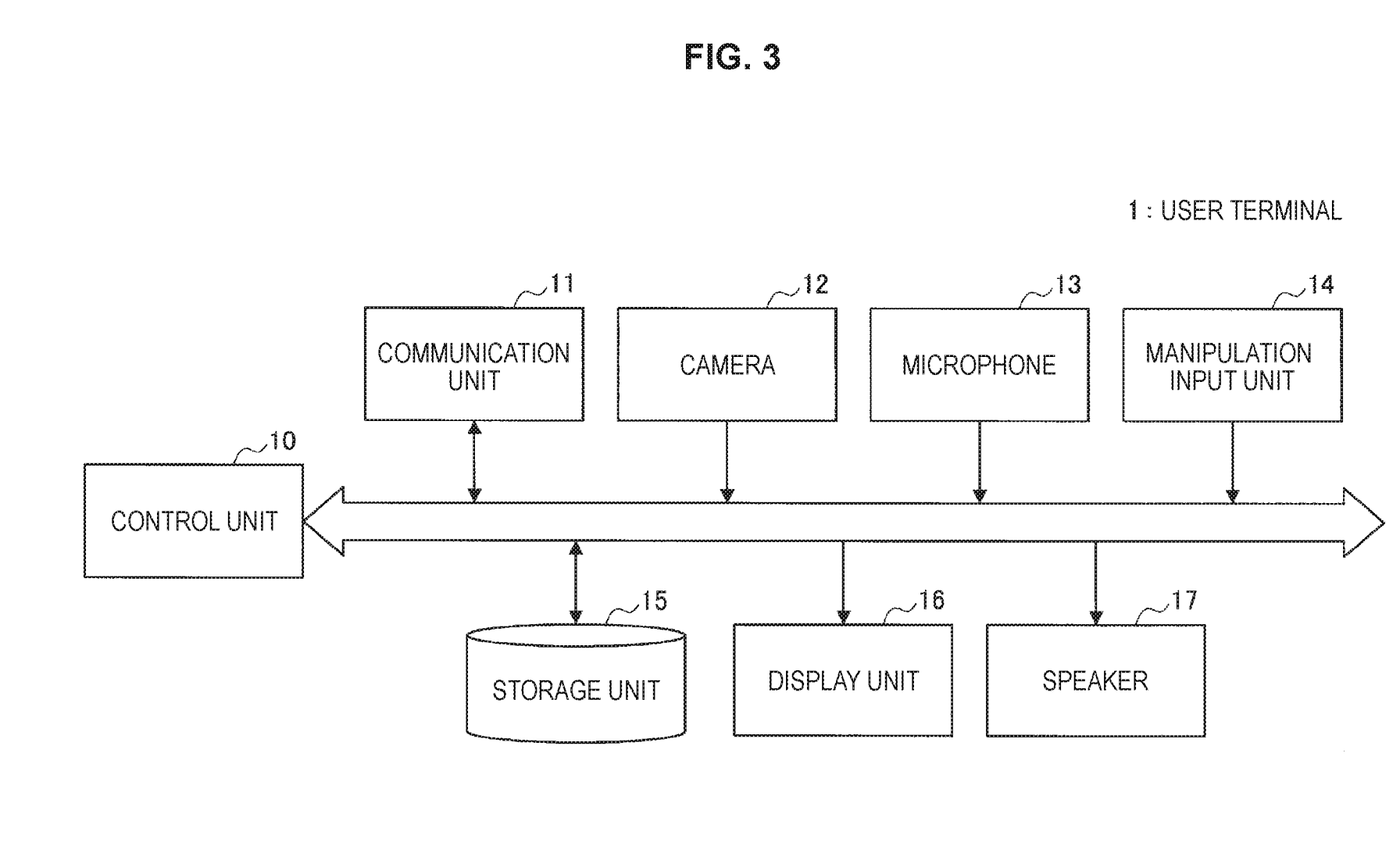
FIG. 3 is a block diagram illustrating a configuration example of a user terminal according to the present embodiment.

FIG. 3 is a block diagram illustrating a configuration example of the user terminal 1 according to the present embodiment. As illustrated in FIG. 3, the user terminal 1 includes a control unit 10, a communication unit 11, a camera 12, a microphone 13, a manipulation input unit 14, a storage unit 15, a display unit 16, and a speaker 17.

The control unit 10 functions as an arithmetic processing device and a control device and controls the overall operation in the user terminal 1 in accordance with various programs. The control unit 10 is implemented by, for example, an electronic circuit such as a central processing unit (CPU) or a microprocessor.

The communication unit 11 transmits and receives data to/from an external device via wire or wirelessly. For example, the communication unit 11 transmits, to the server 2, a captured image acquired by the camera 12, audio data acquired by the microphone 13, musical piece information stored in the storage unit 15, or the like, according to control by the control unit 10 in accordance with a user manipulation input from the manipulation input unit 14.

The camera 12 images surroundings in response to a user manipulation, and outputs an obtained captured image to the control unit 10.

The microphone 13 collects surrounding sound in response to a user manipulation, and outputs collected audio data to the control unit 10.

The manipulation input unit 14, which is implemented by a touch panel, a switch, a button, or the like, detects manipulation input by the user, and outputs a detected input signal to the control unit 10.

The storage unit 15 is implemented by a read only memory (ROM) that stores programs, operation parameters, etc. used for processing of the control unit 10 and a random access memory (RAM) that temporarily stores parameters etc. appropriately changed. In addition, the storage unit 15 stores content such as musical piece information, a captured image, recorded data (including collected audio data).

The display unit 16, which is an example of an output unit, is implemented by a display device such as a liquid crystal display (LCD) device or an organic light emitting diode (OLED) display device. For example, the display unit 16 displays a fashion design image transmitted from the server 2, according to control by the control unit 10.

The speaker 17 is an example of an output unit, and plays audio signals.

<2-3. Configuration of Server>

Figure 4:
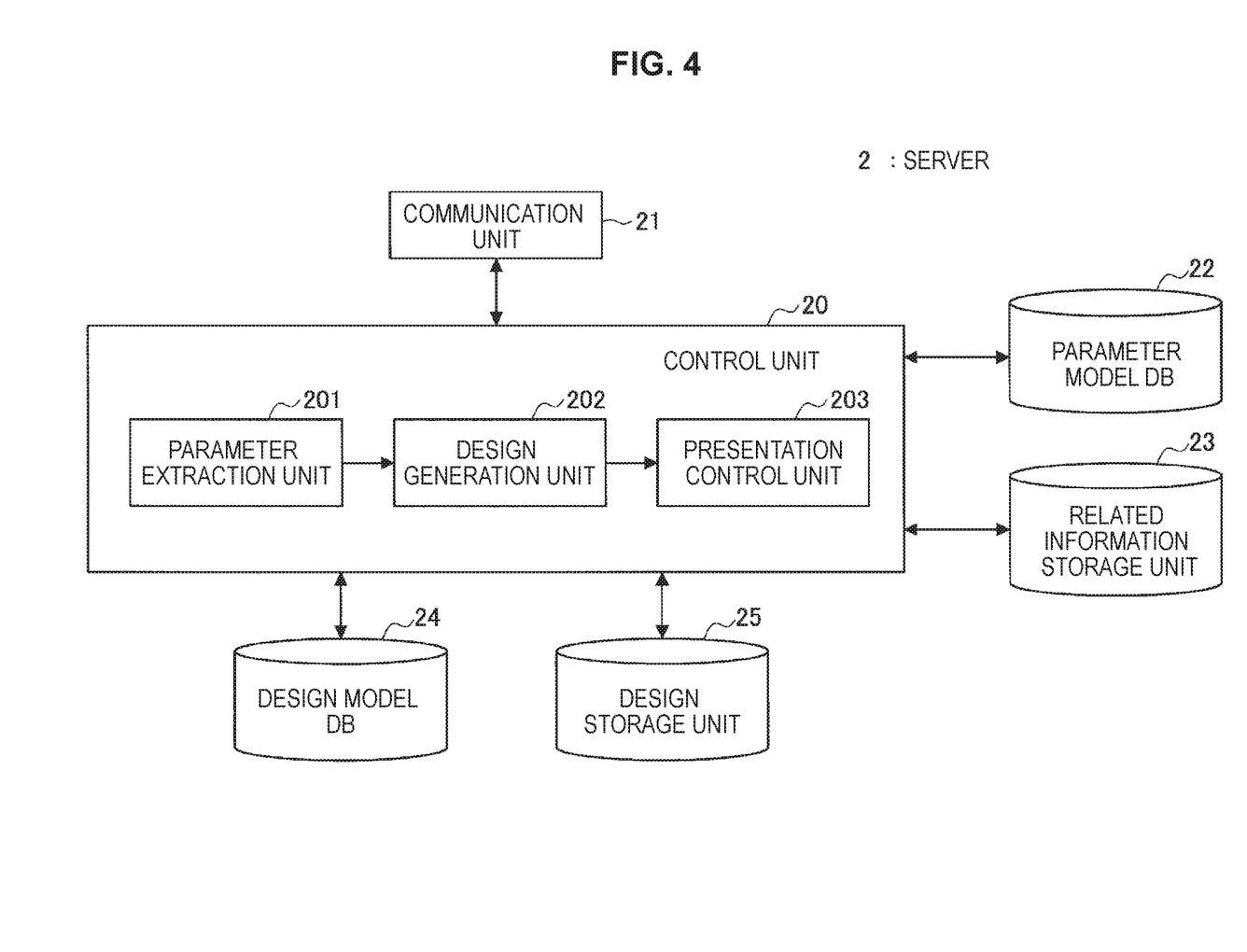
FIG. 4 is a block diagram illustrating a configuration example of a server according to the present embodiment.

FIG. 4 is a block diagram illustrating a configuration example of the server 2 according to the present embodiment. As illustrated in FIG. 4, the server 2 includes a control unit 20, a communication unit 21, a parameter model DB 22, a related information storage unit 23, a design model DB 24, and a design storage unit 25.

The control unit 20 functions as an arithmetic processing device and a control device and controls the overall operation in the server 2 in accordance with various programs. The control unit 20 is implemented by, for example, an electronic circuit such as a CPU or a microprocessor. In addition, the control unit 20 according to the present embodiment functions as a parameter extraction unit 201, a design generation unit 202, and a presentation control unit 203.

The parameter extraction unit 201 extracts parameters for generating a fashion design, on the basis of content to serve as a material of a fashion design transmitted from the user terminal 1 via the communication unit 21 and related information related to the content. The extracted parameters are a color, a shape, a texture (e.g., material quality), and the like that determine a fashion. Hereinafter, parameter extraction by the parameter extraction unit 201 will be specifically described.

(A. Parameter Extraction Based on Content)

As content to serve as a material of a fashion design posted by the user, for example, image data, audio data, moving image data (a combination of image data and audio data), or text data is assumed. The user can take an image of a subject such as an illustration or an animal that the user wants to use for a design with the camera 12 of the user terminal 1 and post the taken image, post a favorite musical piece or music video, or post an explanation or a keyword explaining a design. The posted content is not limited to one piece, and may be a plurality of pieces.

(A-1. Image Content)

The parameter extraction unit 201 extracts, as a parameter, a feature value obtained by performing image analysis on, for example, a posted captured image (an image taken of an illustration drawn on paper, an image taken of a pattern or a print, an image taken of an animal or scenery, etc.). For example, the parameter extraction unit 201 extracts, by image analysis, a type of color included in the captured image, a shape of a subject, a texture of the subject, the subject, or the like. In addition, the parameter extraction unit 201 may extract, instead of the type of color, a light/dark parameter from brightness of the sky etc. in the captured image, for example.

(A-2. Audio Content)

In addition, the parameter extraction unit 201 extracts, as a parameter, a feature value obtained by performing audio analysis on a posted musical piece (an example of music content). For example, the parameter extraction unit 201 acquires a waveform, a frequency component, a pitch, a tempo, and the like of the musical piece by audio analysis, and extracts parameters (color, shape, texture, etc.) from these. Note that what kind of parameter is to be extracted from what kind of waveform and frequency component may be determined by, for example, matching with model data stored in the parameter model DB 22. For example, in the case where vocal voice included in the musical piece is high-tone voice or the case where the tempo is fast, the parameter extraction unit 201 may extract "thin fabric" as a parameter. In addition, the parameter extraction unit 201 may extract a parameter on the basis of a sentence or a keyword obtained by voice recognition of the musical piece. For example, a color, a shape, and a texture corresponding to a keyword of frequent occurrence in the musical piece are extracted as parameters.

(A-3. Moving Image Content)

In addition, the parameter extraction unit 201 extracts, as a parameter, a feature value obtained by separating a posted moving image (e.g., a music video of an artist, a taken moving image in which the user explains an image of a design in speech or gesture, etc.) into image data and audio data, and performing image analysis, scene detection, audio analysis, voice recognition, and the like.

(A-4. Text Content)

In addition, the parameter extraction unit 201 performs semantic analysis (e.g., semantic integration, theme extraction, and sentence summarization) on posted text (e.g., abstract or specific explanation, a keyword, etc.), and extracts parameters that determine a design, such as a color, a shape, and a texture. In addition, in the case where the posted text is an external link, the parameter extraction unit 201 acquires image data, audio data, or text data of the link destination and performs analysis in a manner similar to the above, to extract parameters.

(B. Parameter Extraction Based on Related Information Related to Content)

The parameter extraction unit 201 according to the present embodiment may not only extract parameters directly from content by various types of analysis, but also extract parameters from related information related to content. This enables an image invoked by content to be used for design generation with higher fidelity. Such related information may be stored in the related information storage unit 23 in advance, or may be acquired from another server on the network as necessary. Related information according to the present embodiment is, for example, other content associated with content, metadata embedded in content, reference information retrieved on the basis of a keyword extracted from metadata, or the like. Extracting parameters that determine a design also from such related information enables a design imagined from content specified by the user to be generated with higher fidelity. Hereinafter, each type of related information will be specifically described.

(B-1. Other Content Associated with Content)

Other content associated with content is a same or different type of content that has some bearing on content, and is stored in the related information storage unit 23 in advance. For example, content such as a movie, a drama, a commercial, a TV/Internet program, or a music video in which specific music content is used, and detail information (title, genre, summary, cast, etc.) of the content may be associated with the music content. Thus, the parameter extraction unit 201 can extract parameters (color, shape, texture, etc.) that determine a design from, as well as music content posted by the user, an analysis result of a commercial, a movie, etc. in which the music content is used and content detail information. For example, in the case where it is found by analysis that music content is a cheerful, happy tune, the parameter extraction unit 201 extracts a type of color expressing "cheerfulness" and "happiness" with reference to the parameter model DB 22, and furthermore, extracts a color, a shape, a texture, etc. from the world (an item, a motif, background, etc. of frequent occurrence) of video associated with the music content. Consequently, for example, the world of the user's favorite artist that is expressed in a music video of the artist's tune can be reflected in a fashion design.

(B-2. Metadata Embedded in Content)

Metadata embedded in content is information, such as a title of a musical piece, an artist name, a genre (e.g., pop, metal, Latin, Euro beat, jazz, techno, etc.), and a year of recording, embedded in music content, for example.

(B-3. Reference Information Retrieved on the Basis of Keyword Extracted from Metadata)

In addition, in the present embodiment, reference information acquired by retrieval on the network on the basis of a keyword extracted from the metadata described above may be used as related information. For example, the parameter extraction unit 201 performs image analysis on a reference image (e.g., a fashion image for each music genre) corresponding to a genre retrieved from a database having reference images for respective genres, and an image (e.g., live video, a CD cover, an image of an artist himself/herself, etc.) retrieved on the basis of a title of a musical piece or the artist name, to extract parameters.

(B-4. Reflection of User Preference/Situation)

In addition, in the present embodiment, associating related information in which the user's preference or situation is reflected enables a design preferred by the user to be generated more accurately. Situations of the user include surrounding environment (season, weather, temperature, humidity, place, etc.) of the user or a behavior (a behavior pattern on a weekday, a behavior pattern on a holiday, a schedule, etc.) of the user.

Reflection of the user's preference may be performed using a predetermined learning algorithm by the control unit 20, on the basis of the user's feedback (e.g., whether the user likes it or not) to an output result (i.e., presentation of a fashion design). In the case of reflecting the user's preference by machine learning based on feedback, it is possible to reflect user preference to some extent even in an initial state by giving some kind of initial condition. The initial condition may be set by, for example, a method based on selection by the user himself/herself or a method of automatically learning the user's preference by a user manipulation or sensor data. Note that a result that is obtained by using only information obtained as the initial condition may be used as a final result, without performing machine learning.

(B-4-1. Setting of Input Initial Condition Based on Selection by User Himself/Herself)

As setting of an input initial condition based on selection by the user himself/herself, for example, a questionnaire screen (a check sheet etc.) for grasping the user's preference to some extent is presented in the user terminal 1 at the time of initial setting of an application that executes automatic design generation according to the present embodiment, and the condition is set on the basis of the user's answer.

In addition, the server 2 plays, as samples, a plurality of musical pieces with extremely different features (e.g., different in genre, tempo, etc.) in the user terminal 1, causes the user to select a color corresponding to the musical piece from an input screen, and stores the selected color in the related information storage unit 23 as related information in association with the genre, tempo, or the like of the musical piece. In addition, in the case where the user himself/herself selects and posts a musical piece and an image of scenery or the like invoked by the musical piece, the sever 2 can extract, as a parameter, a dominant color in the image of scenery or the like.

(B-4-2. Automatic Learning Based on User Situation)

In addition to user selection at the time of initial setting as described above, it is also possible to automatically learn the user's preference on the basis of the user's usual situation, and perform initial setting.

For example, in the case where the user watches or listens to content such as a moving image or music on a daily basis with the user terminal 1, when and what kind of content the user watches or listens to are recorded in the background, and the server 2 automatically learns user preference on the basis of these records (i.e., a watching/listening history). Specifically, it is learned, on the basis of the watching/listening history, whether the user likes to listen to aggressive tunes (tunes having a feature of fast tempo etc., such as metal, for example) in the morning or likes to listen to aggressive tunes at night, for example. Thus, in the case where the user likes to listen to aggressive tunes in the morning, for example, "morning" is associated and stored in the related information storage unit 23 as related information in which the user's preference related to aggressive tunes is reflected. On the basis of a result of such learning, for example, in the case where the user posts a tune of an aggressive genre such as metal, the parameter extraction unit 201 extracts a parameter of "light/dark of color: rather bright" on the basis of the related information "morning" associated with aggressive tunes, and also extracts a parameter of "sharp-pointed shape" because the melody is aggressive.

In addition, in the case where the user views photographs (taken images) while listening to music on a daily basis with the user terminal 1, what kind of taken image the user views while listening to what kind of music are recorded in the background, and the server 2 automatically learns user preference on the basis of these records (i.e., a viewing history). Specifically, on the basis of the viewing history, a taken image or a classification (a scenery photograph, a photograph of food, a photograph of an animal, a photograph of a child, a photograph during meal, a photograph of the sea, a photograph of an overseas trip, etc.) of the taken image is associated with music and a type (genre, tempo, pitch, etc.) of the music. On the basis of a result of such learning, for example, in the case where the user posts a photograph of a trip, the parameter extraction unit 201 extracts parameters of color and shape on the basis of an analysis result of music that the user often listens to, associated with the photograph of the trip. By thus extracting parameters for design decision also from music that the user often listens to when seeing a posted photograph, it is possible to design an image that the user imagines from the photograph with higher fidelity.

Note that association between images and music is not limited to the above example, and for example, an image displayed during Web browsing by the user may be associated with background music (BGM) at that time.

As described above, on the basis of a user situation (watching/listening history, viewing history, etc.), related information in which the user's preference is reflected can be associated with content such as a musical piece, a photograph, or a moving image.

In addition, a method for associating related information in which the user's preference is reflected with content is not limited to automatic learning based on a viewing history or a watching/listening history, and for example, the method can be automatic learning based on sensor data detected by various sensors (e.g., a heartbeat sensor, a pulse sensor, a temperature sensor, a perspiration sensor, a motion sensor (a gyro sensor, an acceleration sensor), a microphone, etc.) provided in the user terminal 1 (a smartphone, a wearable terminal, or the like). Note that the various sensors are not limited to those provided in the user terminal 1, and may be installed in an earphone connected to the user terminal 1 via wire or wirelessly, for example. In this case, sensor data acquired by a sensor of the earphone is transmitted to the user terminal 1 via wire or wirelessly.

For example, various sensors detect a heartbeat, a perspiration amount, body temperature, motion, or the like of the user during playback of a musical piece or during image viewing in the user terminal 1, and the server 2 automatically learns user preference about the musical piece or the image on the basis of these detection results and associates the user preference as related information. In addition, for example, the server 2 may perform pattern matching on a heartbeat pattern during playback of a musical piece and a heartbeat pattern during viewing of an image such as a photograph, and associate a musical piece and an image with close patterns.

Note that the parameter extraction unit 201 can also extract parameters from a detection result obtained by a sensor provided in the user terminal 1. In this case, the user terminal 1 transmits sensor data detected by various sensors on a daily basis to the server 2. Note that transmission timing is not particularly limited. More specifically, a temperature sensor is provided in an earphone or the like that directly touches the skin, for example, to sense the user's body temperature, and the server 2 compares the sensed user's body temperature with weather information (weather, temperature, humidity, etc.) at that time, and determines that the user likes light dressing even in winter or is sensitive to cold, for example, thereby grasping the user's preference. Then, the parameter extraction unit 201 takes such user's preference about fashion into consideration at the time of parameter extraction, and thus can extract a parameter such as "thin material quality", "layering", or "clothing with heat retaining properties".

In addition, a smell sensor is provided in the user terminal 1 to sense the user's smell when the user terminal 1 is manipulated by the user or put in a pocket or a bag, and the server 2 performs pattern matching on sensed smell data and a smell database of perfumes and specifies a perfume used by the user, thereby grasping the user's preference. Then, the parameter extraction unit 201 can, in consideration of such a perfume used by the user at the time of parameter extraction, acquire clothes of an advertisement model of the perfume as a reference from the network, for example, and extract a parameter. In addition, the parameter extraction unit 201 can determine the user's degree of assertiveness depending on the strength of the smell, determine that the user has strong assertiveness in the case where the smell is stronger than a predetermined value, and extract a parameter such as making clothes have a vivid color.

In addition, a microphone is provided in the user terminal 1 to sense surrounding sound and noise, and the server 2 performs noise analysis on the basis of sensed environmental sound, thereby grasping, as the user's situation, whether there are many or few people around the user on a daily basis, for example, whether the user is in the city or the countryside. Then, the parameter extraction unit 201 can, in consideration of such a user situation at the time of parameter extraction, acquire information of fashion popular in the city, information of inconspicuous/conspicuous fashion in the country side, and the like as a reference from the network, for example, and extract a parameter. In addition, the server 2 can perform audio analysis on the basis of sensed environmental sound to grasp, as a user situation, animals, insects, etc. that are present around the user on a daily basis, and can extract parameters of using these animals, insects, etc. as motifs at the time of parameter extraction.

The parameter extraction by the parameter extraction unit 201 has been specifically described.

The design generation unit 202 of the control unit 20 generates a design of a predetermined fashion category by using parameters extracted by the parameter extraction unit 201 described above. Here, a fashion category refers to articles related to fashion, and for example, clothing, shoes, bags, or ornaments are assumed. More specifically, tops, jackets/outerwear, pants, all-in-ones, skirts, dresses, suits/ties, fashion sundries, wallets/small goods, earphones, headphones, watches, hair accessories, accessories (rings, necklaces, bangles, earrings, pierced earrings, etc.), underwear, legwear, hats, swimming wear/Yukata, maternity wear, baby clothes, or the like are assumed. As the fashion category, a specific category may be designated by the user, or fashion styling from head to toe may be designated. In addition, fashion category candidates may be presented from the system side to the user for selection, on the basis of the extracted parameters.

Parameters are related to a color, a shape, material quality, etc. that determine a design as described above; hence, the design generation unit 202 generates a fashion design in accordance with these parameters. For example, in the case where the fashion category is "dress" and parameters such as a bright color, a simple, pretty shape, and fluffy material quality are extracted, the design generation unit 202 generates a design of a dress having a breast-switch high-waist shape with a simple line as illustrated in FIG. 1, a bright color such as light gray, salmon pink, light beige, or orange, fluffy material quality, and laced sleeves. Note that various design candidates (data for design generation) corresponding to such parameters are stored in the design model DB 24.

In addition, in the case where a motif or a subject is extracted as a parameter, the design generation unit 202 may generate a design in which the motif or the subject is printed as it is or partly printed.

In addition, the design generation unit 202 according to the present embodiment can generate a design in which the user's feature in appearance is reflected. This is because, in the case of fashion designs, some designs suit the user while others do not, depending on a feature in appearance (e.g., a figure or a facial feature) of the user who wears it. It is possible to enable the user to select in advance whether to take a feature in appearance into account in design generation. The user's feature in appearance may be determined by the control unit 20 of the server 2 on the basis of a captured image of the user transmitted from the user terminal 1, or may be data input by the user himself/herself. The captured image is preferably a full-length image, but is not particularly limited thereto, and for example, the control unit 20 of the server 2 can calculate the figure from a size of the face, etc.

The design generation unit 202 specifies, by pattern matching or the like, an image of a person (a celebrity, a fashion model, etc.) that resembles the user from a database (not illustrated) in the server 2 or information on the Web, on the basis of a feature value of the face or figure information, and uses the person's clothes as a reference for clothes that suit the user (size, color, shape, material quality, etc.).

In addition, the design generation unit 202 may generate a design by merging the color, shape, and texture of clothes acquired from the specified person image with the color, shape, and texture of clothes acquired from a reference image for each genre of musical pieces described above. A merging method is not particularly limited; for example, a reference image for each genre of musical pieces may be preferentially applied first, and in the case where feedback indicating that the user's preference is not met is given from the user, an image of a person resembling the user may be preferentially applied. It is also possible to take and apply an average value of colors, shapes, and textures of clothes that may be acquired from both images. In addition, in accordance with feedback from the user, weighting for which of the both images is to be preferentially reflected may be adjusted. In addition, the design generation unit 202 may perform final design adjustment by further reflecting a feature value such as a pitch of a musical piece.

The presentation control unit 203 has a function of performing control to present a design generated by the design generation unit 202 to the user. Specifically, the presentation control unit 203 performs control such that image data including the generated design is transmitted from the communication unit 21 to the user terminal 1 via the network 3, and displayed on the display unit 16 of the user terminal 1.

The communication unit 21 transmits and receives data to/from an external device via wire or wirelessly. For example, the communication unit 21 connects to the user terminal 1 via the network 3, to receive content posted by the user and transmit information related to a generated design.

The parameter model DB 22 stores model data of parameters (parameters that determine a fashion design, such as a color, a shape, and a texture) corresponding to an analysis result (e.g., light/dark, luminance, a waveform, a frequency component, etc.) of content.

The related information storage unit 23 stores related information related to content. Since specific examples of related information are described above, description is omitted here.

The design model DB 24 stores various design candidates (data for design generation) corresponding to parameters.

The design storage unit 25, in the case where an instruction to save a design presented to the user in the user terminal 1 is given by a user manipulation, stores the design data. In addition, the design storage unit 25 stores designs for each user and saves the designs as a list of design ideas.

The configuration of the server 2 has been specifically described. Note that the configuration illustrated in FIG. 4 is an example, and various databases (the parameter model DB 22, the related information storage unit 23, the design model DB 24, and the design storage unit 25) may be in another server on the network, for example.

Now, operation processing according to the present embodiment will be specifically described with reference to FIGS. 5 and 6.

3. OPERATION PROCESSING

<3-1. Design Presentation Processing>

Figure 5:
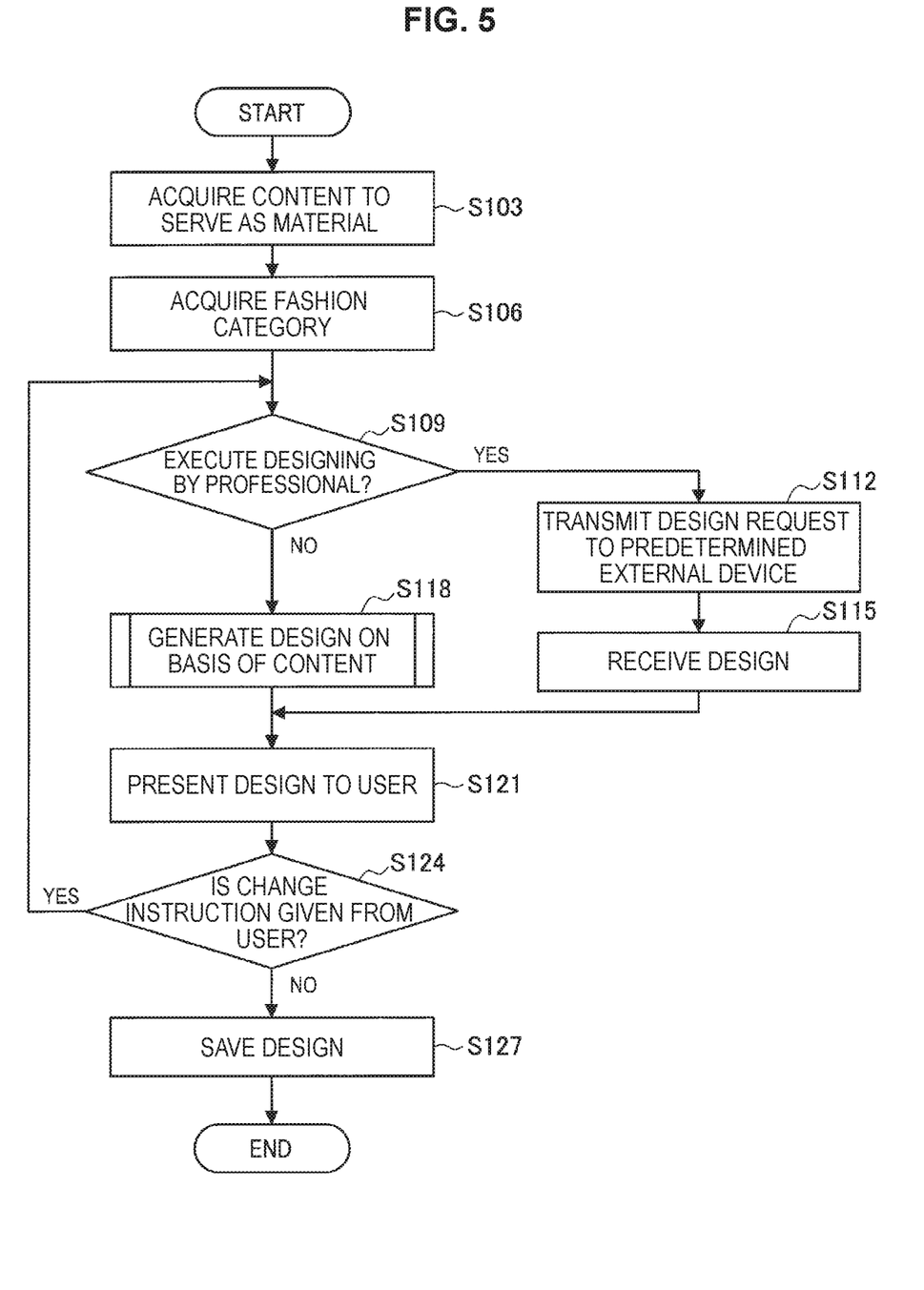
FIG. 5 is a flowchart illustrating design presentation processing according to the present embodiment.

FIG. 5 is a flowchart illustrating design presentation processing according to the present embodiment. As illustrated in FIG. 5, first, the server 2 acquires content to serve as a material for design generation (step S103). Specifically, the server 2 receives an image, a musical piece, text, or the like posted by the user from the user terminal 1 via the communication unit 21.

Next, the server 2 acquires a fashion category as a target of designing (step S106). The fashion category may be, for example, selected by the user in the user terminal 1 and transmitted together with the content.

Then, in the case of executing designing by a professional or an amateur (step S109/Yes), the server 2 transmits a design request to a predetermined external device that is registered (step S112). Specifically, the server 2 transmits, as the design request, the content posted by the user and the designated fashion category to the predetermined external device from the communication unit 21. At this time, the server 2 may also transmit user preference information, a user situation, the user's feature in appearance, or the like. In the present embodiment, the user is enabled to select execution of designing by a professional or an amateur at the time of posting content, etc.

Next, the server 2 receives a design generated by the professional or the amateur from the external device (step S115).

On the other hand, in the case of not executing designing by a professional or an amateur, that is, in the case of automatically generating a design (step S109/No), the control unit 20 of the server 2 generates a design of the designated fashion category on the basis of the posted content (step S118).

Then, the presentation control unit 203 of the server 2 presents the generated design to the user (step S121). Specifically, the presentation control unit 203 performs control such that the design generated by the design generation unit 202 is transmitted from the communication unit 21 to the user terminal 1, and displayed on the display unit 16 of the user terminal 1. At this time, the presentation control unit 203 can report whether there is a product similar to the generated design by an alarm function, and deal with right of portrait and copyright. In addition, the server 2 may be configured to expose the generated design on a social network used by the user, to be able to acquire evaluation and comments from other users.

Next, in the case where an instruction to change design is given from the user (step S124/Yes), the server 2 repeats steps S109 to S121 described above, and presents anew a design in which the instruction from the user is reflected to the user. As the instruction to change design, for example, change of color, shape, or texture, change of a fashion category, posting of new content, change of content, and the like are assumed.

Then, in response to an instruction to save design given by the user, the server 2 saves the design presented to the user in the design storage unit 25 (step S127). In addition, since the instruction to save design given by the user means that the user likes the design, the server 2 may acquire the user's preference information (what kind of fashion the user prefers, etc.) on the basis of the feedback.

The design presentation processing according to the present embodiment has been described. Note that the sever 2 according to the present embodiment may be configured to present, to the user, both of a design provided by a professional or an amateur and a design automatically generated by the design generation unit 202. In addition, the server 2 may be configured to present a plurality of designs automatically generated by the design generation unit 202 to the user. Furthermore, in the case where an instruction to apply for commercialization is given by the user in regard to a saved design, the server 2 may transmit the design to a predetermined external device for commercialization, and make a commercialization request.

<3-2. Design Generation Processing>

Now, design generation processing illustrated in step S118 of FIG. 5 will be specifically described with reference to FIG. 6. FIG. 6 is a flowchart illustrating design generation processing according to the present embodiment.

Figure 6:
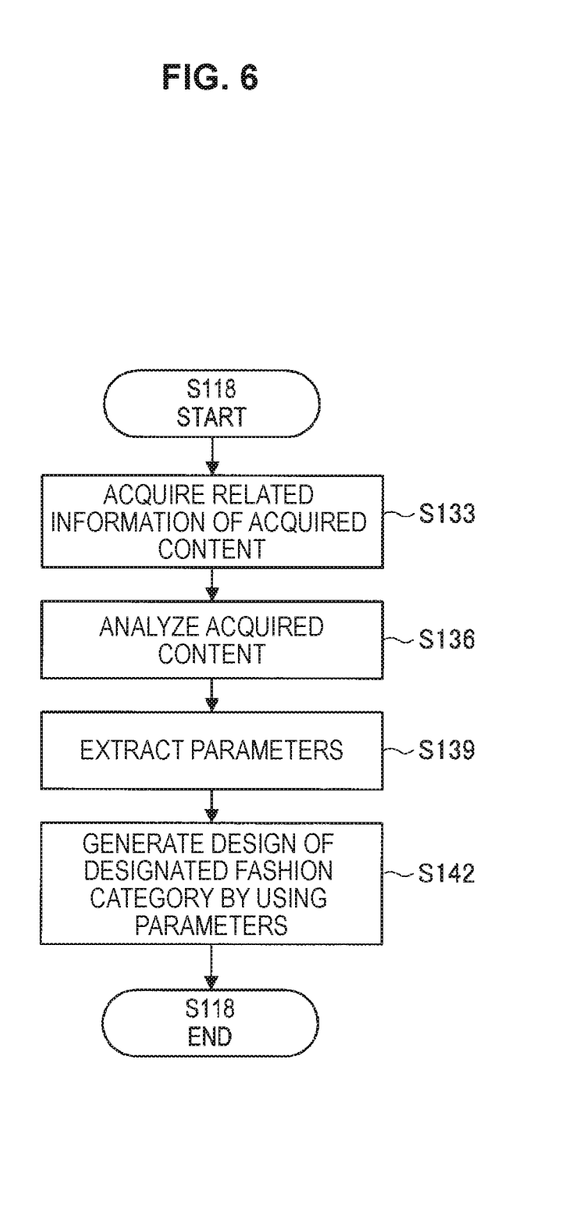
FIG. 6 is a flowchart illustrating design generation processing according to the present embodiment.

As illustrated in FIG. 6, first, the parameter extraction unit 201 of the server 2 acquires related information of the acquired content (step S133). As described above, related information is, for example, other content associated with content, metadata embedded in content, reference information retrieved on the basis of a keyword extracted from metadata, or the like.

Next, the parameter extraction unit 201 analyzes the acquired content (step S136). For example, the parameter extraction unit 201 performs image analysis, scene detection, audio analysis, voice recognition, semantic analysis, or the like.

Then, the parameter extraction unit 201 extracts parameters (color, shape, texture, etc.) for determining a fashion design from an analysis result of the content and related information of the content (step S139).

Then, the design generation unit 202 generates a design of the designated fashion category by using the extracted parameters (step S142). At this time, the design generation unit 202 may use data for design generation corresponding to parameters stored in the design model DB 24.

4. DISPLAY EXAMPLE

Now, an example of presentation of a design to the user according to the present embodiment will be described. Design presentation according to the present embodiment may be performed by, for example, causing one design to be displayed in the user terminal 1 as illustrated in FIG. 1, or causing a plurality of designs to be displayed. Hereinafter, detailed description will be given with reference to FIG. 7.

Figure 7:
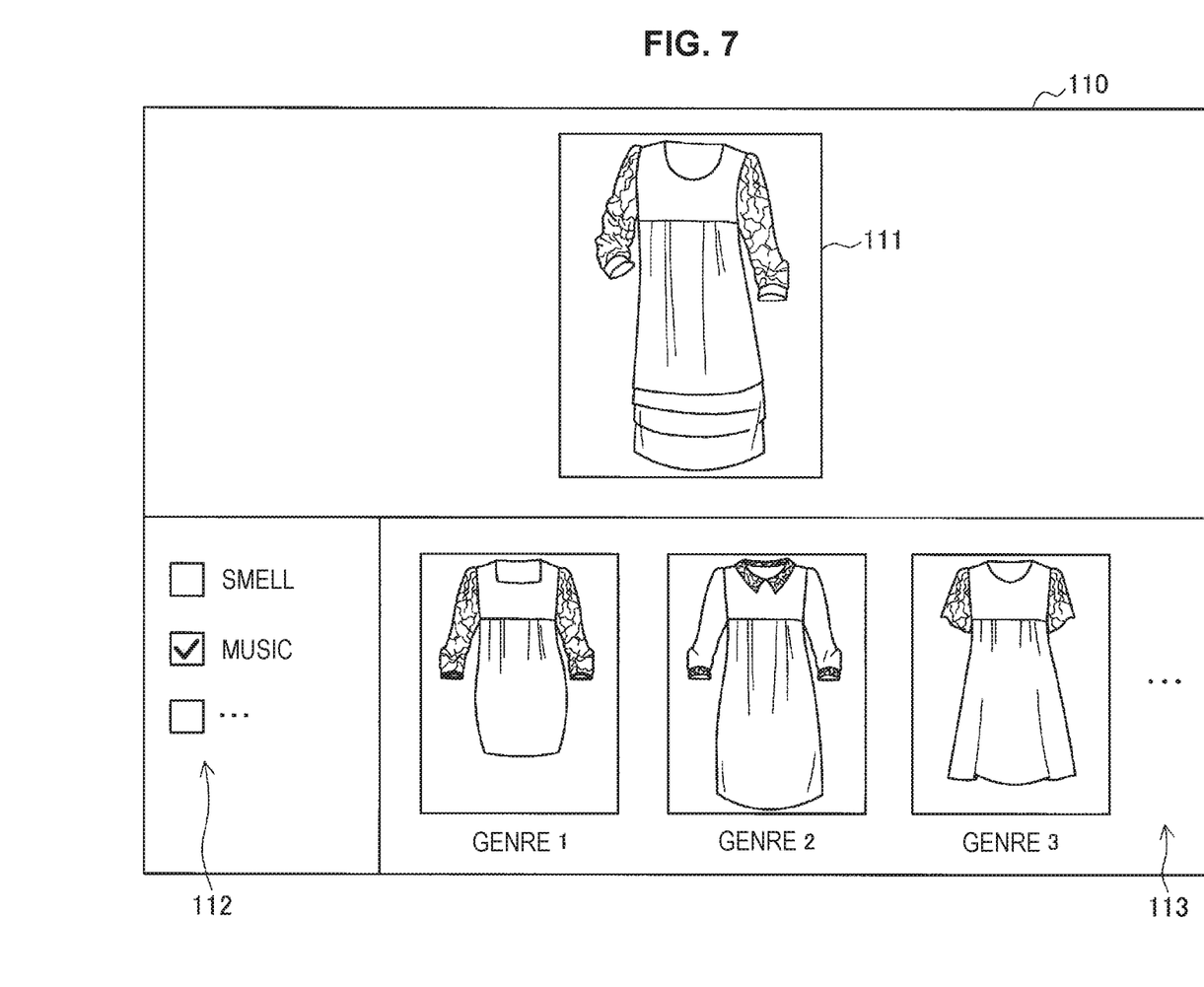
FIG. 7 illustrates an example of a design presentation screen according to the present embodiment.

FIG. 7 illustrates an example of a design presentation screen according to the present embodiment. In the illustrated example, a generated design image 111, a selection screen 112, and a design image group 113 generated in consideration of selected information are displayed on a screen 110. In the selection screen 112 is displayed information to be considered in generating a design. For example, in the case where "smell" is selected, the design generation unit 202 of the server 2 generates a design in consideration of a parameter for each smell, in addition to parameters extracted from content posted by the user and related information. Specifically, designs are generated in consideration of respective parameters extracted from, for example, a fragrance of a flower, a smell of grapefruit, a fragrance of the user (smell data acquired by a smell sensor provided in the user terminal 1 is used), or the like. In addition, in the case where "music" is selected, the design generation unit 202 of the server 2 generates a design in consideration of a parameter for each genre of musical pieces, in addition to parameters extracted from content posted by the user and related information. Specifically, designs are generated in consideration of respective parameters extracted from, for example, Latin, jazz, country, R&B, techno, pop, or the like.

In the design image group 113, a plurality of designs generated in consideration of the respective parameters as described above are displayed. For example, when the user selects one design image from the design image group 113, the design image may be displayed enlarged in an upper part of the screen 110 (a region in which the design image 111 is displayed in FIG. 7).

In addition, design presentation according to the present embodiment may be performed by 3D display. In this case, the design generation unit 202 generates a fashion design having three-dimensional shape data. 3D display enables the user to check a design while freely changing its angle on a two-dimensional screen like the display unit 16 of the user terminal 1. In addition, the presentation control unit 203 can display a fashion design to which various filters have been applied in response to a user manipulation.

For example, the presentation control unit 203 can cause a fashion design to be displayed with combination of predetermined background, degree of light, material quality, or color for each season, as a season filter. For example, in the case where a spring filter is selected, the presentation control unit 203 displays cherry trees and fluttering cherry blossom petals as the background, and further displays a fashion design whose material quality and color are changed to match spring by the design generation unit 202. In addition, in the case where a summer filter is selected, for example, the presentation control unit 203 displays the sea, sunflowers, a beach, etc. as the background, also reproduces strong sunshine, and further displays a fashion design whose material quality and color are changed to match summer by the design generation unit 202. In this manner, the user can intuitively check whether the presented fashion design matches the season.

In addition, the presentation control unit 203 can cause clothes of the presented design waving in the wind to be displayed, as a wind filter. This enables the user to intuitively check lightness and texture of a material used for the clothes of the presented design. In addition, the presentation control unit 203 can cause a color of the presented fashion design to be changed in accordance with a designated degree of light, as a lighting filter, which enables the user to intuitively grasp a difference in the appearance of the color of the fashion design in the case where surrounding illuminance differs (indoors, outdoors, in sunny weather, in cloudy weather, or the like).

In addition, the presentation control unit 203 can cause the presented fashion design to be displayed with its taste changed, as a fashion filter. Specifically, the presentation control unit 203 causes a fashion design in which a predetermined fashion taste is reflected, generated by the design generation unit 202, to be displayed. Examples of fashion tastes include preppy, American casual, eccentric, oriental, coquettish, sporty, dressy, nostalgic, feminine, military, Victorian, mannish, and marine.

In addition, the presentation control unit 203 can cause the presented fashion design to be displayed with its material quality changed to material quality selected by the user, as a material quality filter. As material quality selection items, for example, "texture (hard-soft)", "gloss (shiny-matte)", "material (heavy-light, thick-thin)", and the like are assumed.

5. CONCLUSION

As described above, in the information processing system according to the embodiment of the present disclosure, an article design can be generated on the basis of content selected by a user, and burdens on the user can be reduced.

In this manner, for example, in the case where the user wants to design a fashion to wear when going to a concert of a favorite artist, the user can post a musical piece or a music video of the artist as material content, and acquire a fashion item in which the world of the musical piece or music video, such as a motif, a tone of color, and an atmosphere used therein, is reflected.

In addition, the user is not limited to one person, and the server 2 may generate a plurality of fashion designs on the basis of content (e.g., a captured image, contents of a message, etc.) exchanged between a plurality of users on a social network, for example. At this time, the server 2 can make fashion designs partly correspond to captured images or message contents introduced by the respective users, which makes it possible to present a plurality of fashion designs that are partly different from each other while maintaining a sense of uniformity as a whole. In addition, the server 2 may generate a plurality of fashion designs that are partly different from each other while maintaining a sense of uniformity, in consideration of features in appearance, preference information, etc. of one or more other users designated by the user. Specifically, the server 2 generates a plurality of fashion designs that are partly changed in consideration of features in appearance, preference information, etc. of the respective users (the user himself/herself and the designated one or more other users).

In addition, in the case where a design instruction is input in addition to content posted by the user, the server 2 can generate a design in accordance with this. For example, when the user posts a captured image of an old bag and an explanation such as "a softer material and a print for summer", the design generation unit 202 of the server 2 can generate a design of a new bag on the basis of the shape of the bag extracted from the captured image and parameters (material: softer, print: for summer) extracted from the explanation.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to create a computer program for causing hardware such as a CPU, ROM, and RAM, which are built in the above-described user terminal 1 or server 2, to execute the functions of the user terminal 1 or the server 2. Moreover, a computer-readable storage medium having the computer program stored therein is also provided.

In addition, although the above embodiment describes the information processing system including the user terminal 1 and the server 2, the present disclosure is not limited to this, and for example, the user terminal 1 may include various functions of the control unit 20 and the related information storage unit 23 included in the server 2. This enables the user terminal 1 to execute at least part of the parameter extraction, design generation, and presentation control described above. It is also possible to cause the whole processing performed in the server 2 described above to be executed in the user terminal 1 alone.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

an extraction unit configured to extract a parameter for generating an article design on a basis of content selected by a user and related information related to the content;

a generation unit configured to generate a design of a designated article by using the parameter; and a presentation control unit configured to perform control to present the generated design to the user.

(2)

The information processing device according to (1), in which the related information is a same or different type of content that is associated with the content.

(3)

The information processing device according to (1) or (2), in which the content is music data or image data.

(4)

The information processing device according to (3), in which the related information is metadata embedded in the content.

(5)

The information processing device according to (4), in which the related information is image data retrieved on a basis of a keyword extracted from metadata embedded in music data.

(6)

The information processing device according to (2), in which the related information is content that is associated with the content and in which a user's preference or situation is reflected.

(7)

The information processing device according to any one of (1) to (6), in which the extraction unit extracts a parameter from a feature value obtained by analyzing music data or image data that is the content selected by the user.

(8)

The information processing device according to any one of (1) to (7), in which the parameter is at least one of a color, a shape, and a texture.

(9)

The information processing device according to any one of (1) to (8), in which the generation unit generates the design of the article by further using a user's feature in appearance.

(10)

The information processing device according to any one of (1) to (9), in which the generation unit generates a design of clothing, a shoe, a bag, an ornament, or an interior as the article.

(11)

The information processing device according to any one of (1) to (10), in which the related information is associated with the content on a basis of a result of detection by a sensor.

(12)

The information processing device according to (11), in which the sensor is a heartbeat sensor.

(13)

The information processing device according to (12), in which the related information is music data or image data.

(14)

The information processing device according to any one of (1) to (13), in which the extraction unit extracts the parameter for generating the article design on a basis of a result of detection by a sensor.

(15)

The information processing device according to (14), in which the sensor is a smell sensor.

(16)

The information processing device according to any one of (1) to (15), in which the generation unit changes the design of the article in response to a change instruction from a user.

(17)

An information processing method including, by a processor:

extracting a parameter for generating an article design on a basis of content selected by a user and related information related to the content;

generating a design of a designated article by using the parameter; and performing control to present the generated design to the user.

(18)

A program causing a computer to function as:

an extraction unit configured to extract a parameter for generating an article design on a basis of content selected by a user and related information related to the content;

a generation unit configured to generate a design of a designated article by using the parameter; and a presentation control unit configured to perform control to present the generated design to the user.

REFERENCE SIGNS LIST 1 user terminal
10 control unit
11 communication unit
12 camera
13 microphone
14 manipulation input unit
15 storage unit
16 display unit
17 speaker
2 server
20 control unit
201 parameter extraction unit
202 design generation unit
203 presentation control unit
21 communication unit
22 parameter model DB
23 related information storage unit
24 design model DB
25 design storage unit
3 network

The invention claimed is:

1. An information processing device, comprising:
a central processing unit (CPU) configured to:
receive, via a communication network, first content and sensor data from a user terminal, wherein
the first content is selected on the user terminal based on a first user input, and
the sensor data is obtained by a sensor associated with the user terminal;
generate an analysis result based on one of image analysis or audio analysis on the received first content;
extract a keyword from metadata associated with the received first content;
retrieve second content based on the extracted keyword, wherein the second content is different from the first content;
compare the sensor data with specific preference data, wherein the specific preference data includes a set of preferences corresponding to a set of events;
set a specific machine learning algorithm based on the comparison of the sensor data and the specific preference data;
determine a user preference based on the specific machine learning algorithm;
generate related information associated with the first content, wherein the related information is generated based on the user preference and the second content;
extract a parameter based on the related information, wherein the related information is associated with the first content and the generated analysis result;
generate a design of an article based on the extracted parameter;
apply a specific filter on the generated design, wherein
the specific filter is associated with a season, and
the season is selected on the user terminal based on a second user input; and
control a display of the generated design on the user terminal, wherein the generated design is displayed on the user terminal in combination with a specific background that corresponds to the selected season.

2. The information processing device according to claim 1, wherein a type associated with the related information is one of same or different from a type associated with the first content.

3. The information processing device according to claim 1, wherein the first content is one of music data or first image data.

4. The information processing device according to claim 3, wherein the related information includes the metadata embedded in the first content.

5. The information processing device according to claim 3, wherein the CPU is further configured to:
extract the keyword from the metadata embedded in the music data; and
retrieve second image data based on the extracted keyword, wherein the related information corresponds to the retrieved second image data.

6. The information processing device according to claim 3, wherein the CPU is further configured to:
obtain a feature value from one of the music data or the first image data, wherein the feature value is associated with a feature corresponding to one of the music data or the first image data; and
extract the parameter based on the obtained feature value.

7. The information processing device according to claim 1, wherein the parameter is at least one of a color, a shape, or a texture.

8. The information processing device according to claim 1, wherein the CPU is further configured to generate the design of the article based on a user appearance.

9. The information processing device according to claim 1, wherein the generated design corresponds to a design of one of clothing, a shoe, a bag, an ornament, or an interior.

10. The information processing device according to claim 1, wherein the sensor is a heartbeat sensor.

11. The information processing device according to claim 10, wherein the related information is one of music data or image data.

12. The information processing device according to claim 1, wherein the sensor is a smell sensor.

13. The information processing device according to claim 1, wherein the CPU is further configured to change the design of the article based on a user instruction.

14. An information processing method, comprising:
receiving, via a communication network, first content and sensor data from a user terminal, wherein
the first content is selected on the user terminal based on a first user input, and
the sensor data is obtained by a sensor associated with the user terminal;
generating an analysis result based on one of image analysis or audio analysis on the received first content;
extracting a keyword from metadata associated with the received first content;
retrieving second content based on the extracted keyword, wherein the second content is different from the first content;
comparing the sensor data with specific preference data, wherein the specific preference data includes a set of preferences corresponding to a set of events;
setting a specific machine learning algorithm based on the comparison of the sensor data and the specific preference data;
determining a user preference based on the specific machine learning algorithm;
generating related information associated with the first content, wherein the related information is generated based on the user preference and the second content; and
extracting a parameter based on the related information associated with the first content and the generated analysis result;
generating a design of an article based on the extracted parameter;
applying a specific filter on the generated design, wherein the specific filter is associated with a season, and
the season is selected on the user terminal based on a second user input; and
controlling a display of the generated design on the user terminal, wherein the generated design is displayed on the user terminal in combination with a specific background that corresponds to the selected season.

15. A non-transitory computer-readable medium having stored thereon, computer-executable instructions which, when executed by a processor, cause the processor to execute operations, the operations comprising:
receiving, via a communication network, first content and sensor data from a user terminal, wherein
the first content is selected on the user terminal based on a first user input, and
the sensor data is obtained by a sensor associated with the user terminal;
generating an analysis result based on one of image analysis or audio analysis on the received first content;
extracting a keyword from metadata associated with the received first content;
retrieving second content based on the extracted keyword, wherein the second content is different from the first content;
comparing the sensor data with specific preference data, wherein the specific preference data includes a set of preferences corresponding to a set of events;
setting a specific machine learning algorithm based on the comparison of the sensor data and the specific preference data;
determining a user preference based on the specific machine learning algorithm;
generating related information associated with the first content, wherein the related information is generated based on the user preference and the second content; and
extracting a parameter based on the related information associated with the first content and the generated analysis result;
generating a design of an article based on the parameter; and
applying a specific filter on the generated design, wherein the specific filter is associated with a season, and
the season is selected on the user terminal based on a second user input; and
controlling a display of the generated design on the user terminal, wherein the generated design is displayed on the user terminal in combination with a specific background that corresponds to the selected season.

* * * * *